United States Patent
Jensen et al.

(10) Patent No.: US 7,816,023 B2
(45) Date of Patent: Oct. 19, 2010

(54) MAGNETIC RECORDING TAPE HAVING LARGE PARTICLES IN MAGNETIC RECORDING LAYER

(75) Inventors: Tryg R. Jensen, St. Paul, MN (US); C. Thomas Jennings, Woodbury, MN (US); Larold L. Olson, Lindstrom, MN (US)

(73) Assignee: Imation Corp., Oakdale, MN (US)

( * ) Notice: Subject to any disclaimer, the term of this patent is extended or adjusted under 35 U.S.C. 154(b) by 216 days.

(21) Appl. No.: 12/004,644

(22) Filed: Dec. 21, 2007

(65) Prior Publication Data

US 2009/0162701 A1    Jun. 25, 2009

(51) Int. Cl.
*G11B 5/66* (2006.01)
(52) U.S. Cl. .................................. 428/842
(58) Field of Classification Search ................. None
See application file for complete search history.

(56) References Cited

U.S. PATENT DOCUMENTS

| 5,503,922 | A | 4/1996 | Shimasaki et al. |
| 7,186,472 | B2 * | 3/2007 | Zinbo .................... 428/844.3 |
| 7,425,378 | B2 * | 9/2008 | Yamazaki et al. ........... 428/840 |

OTHER PUBLICATIONS

Abstract of JP 02-287921, Igari et al., Nov. 28, 1990.*

* cited by examiner

*Primary Examiner*—Holly Rickman
(74) *Attorney, Agent, or Firm*—Shumaker & Sieffert, P.A.

(57) ABSTRACT

A magnetic recording tape includes an elongated substrate and a magnetic film coated over the elongated substrate, where the magnetic film includes a first magnetic recording layer. The first magnetic recording layer includes particles having a diameter that is between a factor from about 2 to 5 greater than a thickness of the first magnetic recording layer.

10 Claims, 4 Drawing Sheets

MAGNETIC RECORDING TAPE HAVING LARGE PARTICLES IN MAGNETIC RECORDING LAYER

FIELD

Aspects relate to magnetic recording tape and, in particular, to a magnetic recording tape having a low friction and low bit error rate magnetic layer.

BACKGROUND

Magnetic recording tapes are widely used in audio, video, and computer data storage applications. Magnetic recording tapes generally include a substrate coated on one side with a backside and on an opposite side with a magnetic side.

The substrate provides a carrier or support for the tape and includes non-magnetic recording supports formed of, for example, polyesters or other suitable polymers.

The backside provides a support to the recording tape and minimizes undesirable cupping of the tape toward the magnetic side. The backside coating (when dry) contacts guide flanges and/or guide rollers in the cartridge/tape drive system.

The magnetic side includes a magnetic recording layer that has one or more magnetic metal particle powders or pigments dispersed in a binder system that is configured to record and store information. The finished magnetic recording tape is wound/unwound from a cartridge through a tape drive system to enable a read/write head of the drive to read data from, or write data to, the magnetic recording surface.

Linear recording densities for magnetic tapes have been increasing and the magnetic recording layer has become smoother. However, as the magnetic recording layer becomes smoother, the smoothness will eventually cause the magnetic recording layer to undesirably stick to the drive head when the tape movement stops. Sticking of the magnetic tape to components of the drive prevents the tape from running in the drive, can cause tape breakage, and is associated with reduced tape durability.

For these and other reasons, there is a need for the present invention.

SUMMARY

One aspect provides a magnetic recording tape including an elongated substrate and a magnetic film coated over the elongated substrate, where the magnetic film includes a first magnetic recording layer. The first magnetic recording layer includes particles having a diameter that is between a factor from about 2 to 5 greater than a thickness of the first magnetic recording layer.

Another aspect provides a magnetic recording tape including an elongated substrate defining a first surface and a second surface opposite the first surface, and a first magnetic side coated over the elongated substrate. The first magnetic side includes a first support layer coated on the first surface of the elongated substrate, a first magnetic recording layer coated on the first support layer, and particles disposed in the first magnetic recording layer. The particles contact the first support layer and protrude out of the first magnetic recording layer. The particles are adapted to configure the first magnetic recording layer to have an 5-pass static friction of less than about 80 grams force.

Another aspect provides a magnetic recording tape including an elongated substrate defining a first surface and a second surface opposite the first surface, a first magnetic side coated over the first surface of the elongated substrate, where the first magnetic side is configured to provide a bit error rate of less than $1 \times 10^{-6}$ for recording densities of between 180-210 kfci, and means for configuring the first magnetic side to have an 5-pass static friction of less than about 80 grams force.

BRIEF DESCRIPTION OF THE DRAWINGS

Embodiments are better understood with reference to the following drawings. The elements of the drawings are not necessarily to scale relative to each other. Like reference numerals designate corresponding similar parts.

DETAILED DESCRIPTION

In the following detailed description, specific embodiments are described and it is to be understood that other embodiments may be utilized, and structural or logical changes made, without departing from the scope of the disclosure. The following detailed description, therefore, describes certain embodiments and is not to be taken in a limiting sense. The scope of the disclosure is defined by the appended claims.

Embodiments provide a magnetic dispersion formulated for coating onto a substrate of a magnetic tape where the magnetic dispersion includes nano particles formulated to create a controlled nano-texture on a surface of the magnetic recording tape. The nano-textured magnetic recording surface provides a smooth magnetic recording layer configured to function in a tape drive without sticking and configured to have low friction to decrease head-tape contact that minimizes tape wear and reduces stain generation.

Embodiments provide magnetic recording tapes having very high density (greater than 180 kilo flux changes per inch, 180 kfci) with low error rates (fewer than $1 \times 10^{-6}$). Embodiments provide a surprising result in that particles added to the magnetic recording layer selected to have a size of about 2-4 times a size of the thickness of the magnetic recording layer result in a bit error rate of less than $1 \times 10^{-6}$ at very high recording densities, for example, recording densities of between 180-210 kfci. The particles that are added to the magnetic recording layer protrude from the magnetic recording layer to provide a low friction magnetic recording surface having a surprisingly low bit error rate and high signal-to-noise ratio.

Figure 1:
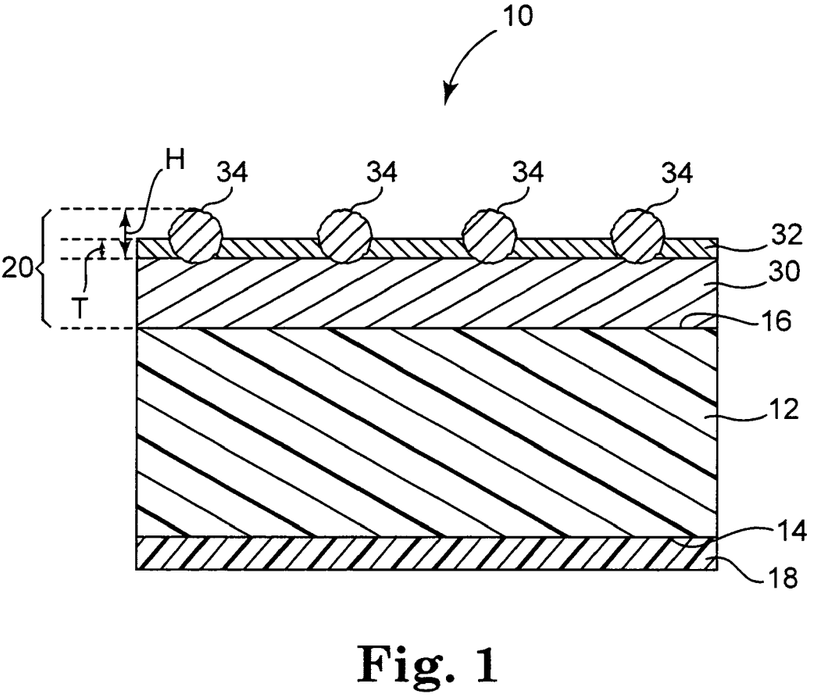
FIG. 1 is a schematic cross-sectional view of a magnetic recording tape including particles that are larger than a thickness of a magnetic recording layer according to one embodiment.

FIG. 1 is a schematic cross-sectional view of a magnetic recording tape 10 according to one embodiment. The magnetic recording tape 10 includes a substrate 12 defining a first surface 14 and a second surface 16 opposite first surface 14, a backside 18 applied to the first surface 14, and a magnetic film 20 or magnetic side 20 applied to the second surface 16. The substrate 12 provides a support or carrier for the tape 10, and the magnetic side 20 generally extends over the substrate 12 to provide a magnetically recordable medium.

In one embodiment, the magnetic recording tape 10 is configured for use in high density recording applications, such as for use with T10000, LTO3, LTO4, LTO5, Quantum S5, Quantum S6, 3592, or other suitably designed magnetic recording tape drives, while simultaneously providing a durable tape.

In one embodiment, the magnetic recording tape 10 is provided in a suitable LTO4 or LTO5 tape cartridge and is configured to conform to specifications of such cartridges employed in LTO4/LTO5 drives. In one embodiment, the magnetic recording tape 10 has a width or form factor of 0.5 inch, is less than 10 microns thick, and the magnetic side 20 is configured to support at least a 30 MB/in$^2$ net uncompressed density utilizing a linear density of at least 200 kbpi.

The Substrate

The substrate 12 includes conventional non-magnetic recording medium substrates/supports. In one embodiment, the substrate 12 is about 0.5 inches (1.27 cm) wide and has a thickness between 177 micro inches (4.5 μm) and 205 microinches (5.21 μm). Suitable materials for substrate 12 include polyesters such as polyethylene terephthalate (PET), polyethylene naphthalate (PEN), blends or copolymers of polyethylene terephthalate and polyethylene naphthalate; polyolefins (e.g., polypropylene); cellulose derivatives; polyamides; and polyimides. In one example, the substrate 12 is fabricated of PEN in elongated tape form.

The Backside

The backside 18 is coated over the first side 14 of the substrate 12 and supports the magnetic side 20 to minimize cupping and curling of the edges of the magnetic recording tape 10. In one embodiment, the backside 18 includes a soft (i.e., Moh's hardness <5) non-magnetic particle material such as carbon black or silicon dioxide particles. In one embodiment, the backside 18 includes a carbon black component in combination with appropriate binder resins.

Various pigments of the backside 18 are dispersed as inks with appropriate binders, surfactant, ancillary particles, and solvents. In one embodiment, the backside binder includes at least one of the following: a polyurethane polymer, a phenoxy resin, or nitrocellulose added in an amount appropriate to modify coating stiffness as desired. In one embodiment, the backside 18 is coated to have a thickness between about 23 micro inches (0.58 μm) and about 28 micro inches (0.71 μm).

The Magnetic Film/Side: Support Layer and Magnetic Recording Layer

In one embodiment, the magnetic side 20 includes a support layer 30, a magnetic recording layer 32 disposed on the support layer 30, and particles 34 distributed or disposed in the magnetic recording layer 32. The support layer 30 extends over the second surface 16 of the substrate 12, and in one embodiment the support layer 30 is directly bonded to the substrate 12. In other embodiments, the support layer 30 is bonded to the substrate via an intermediate layer (not shown), such as a primer layer.

The magnetic recording layer 32 extends over and is directly bonded to the support layer 30. In one embodiment, the magnetic recording layer 32 has a thickness T and the particles 34 have a dimension H that is a factor of between about 2-5 greater than the thickness T of the magnetic recording layer 32.

The Support Layer

In one embodiment, the support layer 30 includes a primary pigment material and conductive carbon black and is essentially non-magnetic. The primary pigment material includes a non-magnetic or soft magnetic powder. As used herein, the term "soft magnetic powder" refers to a magnetic powder having a coercivity of less than about 23.9 kA/m (300 Oe). By forming the support layer 30 to be essentially non-magnetic, the electromagnetic characteristics of the magnetic recording layer 32 are not substantially adversely affected by the support layer 30. However, to the extent that no substantial adverse effect is caused, the support layer 30 may contain a small amount of magnetic powder.

In one embodiment, the primary pigment material includes non-magnetic particles, such as iron oxides, titanium dioxide, titanium monoxide, alumina, tin oxide, titanium carbide, silicon carbide, silicon dioxide, silicon nitride, boron nitride, etc., and, as described, soft magnetic particles. Optionally, these primary pigment materials are provided in a form coated with carbon, tin, or other electro-conductive material. In one embodiment, the primary pigment material is formed of a non-magnetic α-iron oxide, which can be acidic or basic in nature. In one example, the α-iron oxides or other primary pigment particles are included in the support layer 30 at a volume concentration of greater than about 35%. Component volume percent as used in this Specification are volume percents that are calculated by converting relative formulation material mass fractions by their pure component densities to obtain relative material volumes. The component volume percent was obtained by dividing these relative material volumes by the ratio of their sum to 100. Suitable α-iron oxides are commercially available from Dowa Mining Company Ltd. of Tokyo, Japan; Toda Kogyo Corp. of Hiroshima, Japan; and Sakai Chemical Industry Co. of Osaka, Japan.

The conductive carbon black material provides a level of conductivity that prohibits the magnetic recording layer 32 from charging with static electricity. The total amount of conductive carbon black and electro-conductive coating material in the support layer 30 is selected to be sufficient to contribute to providing a resistivity of the magnetic side 20 that is suitable for use on advance magnetoresistive heads. In one embodiment, the resistivity of the magnetic side 20 is less than about $1 \times 10^8$ ohm/cm$^2$.

In one embodiment, a dispersant is included in the support layer 30 formulation to disperse the carbon black particles. The dispersant additive is believed to improve overall dispersion rheology when coating the carbon black particles by effectively dispersing the carbon black to provide enhanced tape conductivity. Suitable dispersants include Disperbyk 161, Disperbyk 2000, or Disperbyk 2001 available from BykChemie (Altana company), Germany, added at about 2 parts per 100 parts of iron oxide.

In some embodiments, the support layer 30 includes an abrasive grain or head cleaning agent. Suitable abrasive grains include aluminum oxide, silica, $ZrO_2$, and $Cr_2O_3$.

In one embodiment, the support layer 30 includes a binder resin, such as a thermoplastic resin, in conjunction with other resin components such as binders and surfactants used to disperse the head cleaning agent, a surfactant (or wetting agent), and one or more hardeners. In one embodiment, the binder system of the support layer 30 includes a combination of a primary polyurethane resin and a vinyl chloride resin, a vinyl chloride-vinyl acetate copolymer, vinyl chloride-vinyl acetate-vinyl alcohol copolymer, vinyl chloride-vinyl acetate-maleic anhydride, a non-halogenated vinyl copolymer, copolymers of monomers such as (meth)acrylonitrile; a non-halogenated, hydroxyl functional vinyl monomer; a non-halogenated vinyl monomer bearing a dispersing group, and one or more non-halogenated nondispersing vinyl monomers. Other suitable binder resins are also acceptable. Examples of useful polyurethanes include polyester-polyurethane, polyether-polyurethane, polycarbonate-polyurethane, polyester-polycarbonate-polyurethane, and polycaprolactone-polyurethane. Other resins such as bisphenol-A epoxide, styrene-acrylonitrile, and nitrocellulose are also acceptable for use in the support layer binder system.

In one embodiment, a primary polyurethane binder is incorporated into the support layer 30 in amounts of from about 5 to about 15 parts by weight based on 100 parts by weight of the primary pigment material. In one embodiment, the vinyl binder or vinyl chloride copolymer binder is incorporated into the support layer 30 in amounts from about 5 to about 20 parts by weight based on 100 parts by weight of the primary pigment material.

In one embodiment, the binder system includes a surface treatment agent such as phenylphosphinic acid (PPiA), 4-nitrobenzoic acid, and/or various other adducts of sulfuric, sulfonic, phosphoric, phosphonic, and/or carboxylic acids. In one embodiment, the binder system also contains a hardening agent or activator such as isocyanate, and/or polyisocyanate. In one example, the hardening agent is incorporated into the support layer 30 in amounts from about 2 to about 5 parts by weight based on 100 parts by weight of the primary support layer pigment.

In some embodiments, the support layer 30 includes one or more lubricants such as a fatty acid and/or a fatty acid ester. The incorporated lubricant(s) exist throughout the magnetic side 20 and have mobility sufficient to reach the recording surface 36 of the magnetic recording layer 32 when the lubricant is released by the support layer 30. The lubricant(s) reduce friction on the magnetic coating side, enabling the tape 10 to contact drive components with low drag, and protects the exposed magnetic recording surface 36 from wear. Thus, in one example the lubricant(s) provided in both the support layer 30 and the magnetic recording layer 32 are selected and formulated in combination.

In one embodiment, the support layer 30 includes a stearic acid lubricant that is at least 90% pure as the fatty acid and butyl stearate as a fatty acid ester. Although technical grade acids and/or acid esters can also be employed for the lubricant component, incorporation of high purity lubricant materials generally ensures robust performance of the resultant coating. Alternatively, other acceptable fatty acids include myristic acid, palmitic acid, oleic acid, etc., and/or their mixtures. The support layer 30 can further include a fatty acid ester lubricant such as butyl stearate, isopropyl stearate, butyl oleate, butyl palmitate, butylmyristate, hexadecyl stearate, and oleyl oleate. The fatty acids and fatty acid esters may be employed singly or in combination. In one embodiment, the lubricant is incorporated into the support layer 30 in an amount of from about 1 to about 10 parts by weight, and preferably from about 1 to about 5 parts by weight, based on 100 parts by weight of the primary pigment material.

In one embodiment, the coating material of the support layer 30 is solvent-based. In one example, the solvents include cyclohexanone with a concentration in the range of about 5% and about 50%, methyl ethyl ketone with a concentration in the range of about 30% and about 90%, and toluene with a concentration in the range of about 0% and about 40%. Alternatively, other solvents or solvent combinations including, for example, xylene, tetrahydrofuran, methyl isobutyl ketone, and methyl amyl ketone, are employed in formulating the coating material of the support layer 30.

The materials for the support layer 30 are mixed with the surface treated primary pigment, and the support layer 30 is coated onto the substrate 12. In one embodiment, the resultant support layer 30 has a thickness of between about 30 microinches (762 nm) to about 40 micro-inches (1016 nm).

The Magnetic Recording Layer

In one embodiment, the magnetic recording layer 32 includes a dispersion of magnetic pigments, an abrasive or head cleaning agent (HCA), a binder system, one or more lubricants, and/or a conventional surfactant or wetting agent, and the particles 34 are distributed or disposed in the magnetic recording layer 32. In one embodiment, the volume concentration of the magnetic pigments in the magnetic recording layer is greater than about 35%, preferably, greater than about 40%, the magnetic recording layer 32 has a thickness T from about 80-120 nm, more preferably the thickness T of the magnetic layer 32 is about 100 nm, and the particles 34 have a dimension H that is a factor of between about 2-5 greater than the thickness T of the magnetic recording layer. In one exemplary embodiment, the magnetic recording layer 32 has a thickness T of about 100 nm and the particles 34 have a mean diameter dimension H of about 300 nm, such that the particles 34 contact the support layer 30 and protrude out of the magnetic recording layer 32.

The magnetic pigments include, for example, metallic iron and/or alloys of iron with cobalt and/or nickel, and magnetic or non-magnetic oxides of iron, other elements, or mixtures thereof, which will hereinafter be referred to as metal particles. Alternatively, the metal particles include hexagonal ferrites such as barium ferrites.

"Coercivity" and "magnetic coercivity" are synonymous and refer to the intensity of the magnetic field needed to reduce the magnetization of a ferromagnetic material (in this case the magnetic recording layer 32) to zero after the material has reached magnetic saturation. In one embodiment, the magnetic pigment utilized in the magnetic recording medium has a coercivity greater than about 183 kA/m (2300 Oe).

The magnetic pigments may contain various additives, such as semi-metal or non-metal elements and their salts or oxides, such as Al, Co, Y, Ca, Mg, Mn, Na, and other suitable additives. The selected magnetic pigment may be treated with various auxiliary agents before it is dispersed in the binder system.

The head cleaning agent is added to the magnetic recording layer 32 dispersion separately, or is dispersed within a binder system prior to addition to the magnetic recording layer 32 dispersion. In one embodiment, the head cleaning agent includes aluminum oxide. Other abrasive grains, such as silica, $ZrO_2$, $CrO_3$, etc., are also acceptable either alone or in mixtures with aluminum oxide or each other to form the head cleaning agent.

The binder system of the magnetic recording layer 32 includes at least one binder resin, such as a thermoplastic resin, in conjunction with other resin components, such as binders and surfactants used to disperse the head cleaning agent, a surfactant or wetting agent, and one or more hardeners. In one embodiment, the binder system of the magnetic recording layer 32 includes a combination of a primary polyurethane resin and a vinyl resin. Examples of suitable blends or co-polymers of polyurethanes include polyester-polyurethane, polyether-polyurethane, polycarbonate-polyurethane, polyester-polycarbonate-polyurethane, and polycaprolactone-polyurethane. The vinyl resin includes a vinyl chloride resin, a vinyl chloride-vinyl acetate copolymer, vinyl chloride-vinyl acetate-vinyl alcohol copolymer, vinyl chloride-vinyl acetate-maleic anhydride or the like, and a non-halogenated vinyl copolymer. Resins such as bis-phenyl-A epoxide, styrene-acrylonitrile, and nitrocellulose are also acceptable.

In one embodiment, the primary polyurethane binder is incorporated into the magnetic recording layer 32 in an amount of about 4 to about 10 parts by weight based on 100 parts by weight of the magnetic pigment, and the vinyl or vinyl chloride binder is incorporated in an amount of from about 8 to about 20 parts by weight based on 100 parts by weight of the magnetic pigment.

In one embodiment, the magnetic side 20 includes one or more lubricants such as a fatty acid and/or a fatty acid ester. During use, the lubricant is depleted from the recording surface, and the lubricant(s) provided in the support layer 30 are selected, configured, and formulated to replenish lubricant at the recording surface. Suitable lubricants include fatty acid lubricants, stearic acid that is at least about 90% pure, and/or butyl palmitate, myristic acid, palmitic acid, oleic acid, etc., and their mixtures, or a fatty acid ester such as butyl stearate, isopropyl stearate, butyl oleate, butyl palmitate, butylmyristate, hexadecyl stearate, and oleyl oleate. The fatty acids and fatty acid esters may be employed singly or in combination. In one embodiment, lubricants are incorporated into the magnetic recording layer 32 in an amount from about 1 to about 10 parts by weight based on 100 parts by weight of the magnetic pigment.

In one embodiment, a surfactant or wetting agent is added separately to the magnetic recording layer dispersion including one or more of the above-identified components, or added to the binder system prior to being added to the magnetic recording layer dispersion. In one embodiment, phenylphosphinic acid (PPiA), 4-nitrobenzoic acid, and various other adducts of sulfuric, sulfonic, phosphoric, phosphonic, and carboxylic acids are utilized. In one embodiment, the binder system includes a hardening agent or activator such as isocyanate, and/or polyisocyanate. In one example, the hardener component is incorporated into the magnetic recording layer 32 in an amount of from about 2 to about 6 parts by weight based on 100 parts by weight of the magnetic pigment.

In one embodiment, solvents are added to the magnetic recording layer 32 dispersion prior to coating. Suitable solvents include cyclohexanone with a concentration in the range of about 5% about 50%, methyl ethyl ketone with a concentration in the range of about 30% to about 90%, or toluene with a concentration in the range of about 0% and about 40%. Other solvents or solvent combinations including, for example, xylene, tetrahydrofuran, methyl isobutyl ketone, and methyl amyl ketone are also acceptable.

In one embodiment, the magnetic recording layer 32 is formed to have a remnant magnetization-thickness product (Mr*t) of between about 1.5 to 3.0 memu/cm². The term "remnant magnetization-thickness product" refers to the product of the remnant magnetization after saturation in a strong magnetic field (796 kA/m, for example) multiplied by the thickness of the magnetic coating.

In one embodiment, the particles 34 include silica particles such as Nippon Shokubai Seahostar having an average size between about 0.1-2.5 μm (100-2500 nm); Fiber Optic Center AngstromSphere particles having an average size between about 0.25-1.0 μm; Nissan Chemical SNOWTEX particles having an average size between about 5-90 nm. In one embodiment, the particles 34 include titanium dioxide particles such as Dupont Ti-Pure R960 having an average size between about 0.50 μm; antimony pentoxide particles such as Nissan Chemical Suncolloid having an average size between about 10-68 nm; silicon Carbide particles such as American Elements silicon carbide nano-particles having an average size between about 10-150 nm; or alumina particles identified as Sumitomo alumina particles having an average size between about 50-1000 nm. In one exemplary embodiment, the particles 34 include 300 nm Seahostar silica particles added at a weight % at 0.3 weight %, 0.6 weight %, or 1.0 weight % to the magnetic layer dispersion.

In one embodiment, the oxide surface of the particles 34 is modified to stabilize the particles in the organic solvents employed in coating and to compatibilize the particles 34 with the binders. Suitable coupling agents configured to modify the oxide surface of the particles 34 include titanium trisisostearyl isopropoxide or other silane coupling agents. Two such suitable silane coupling agents include:

In this specification, the size measurements of various particles are suitably obtainable by a high resolution transmission electron microphotograph and an image analyzer. Particle size can be obtained by tracing the outline of a high resolution transmission electron microphotograph (magnification of from 20,000 to 100,000) with an image analyzer. Particle sizes variously obtainable as follows: (1) in the case where the shapes of particles are acicular, spindle-like or columnar (provided that the height is larger than the longest diameter of the base), a particle size is indicated by the length of a long axis constituting the particle, i.e., a long axis length, (2) in the case where the shapes of particles are tabular or columnar (provided that the thickness or height is smaller than the longest diameter of the tabular plane or the base), indicated by the longest diameter of the tabular plane or the base, i.e., a tabular diameter, and (3) in the case where the shapes of particles are spherical, polyhedral or amorphous and it is impossible to specify the length of long axis constituting the particle from the shape, indicated by an equivalent-circle diameter. An equivalent-circle diameter is a diameter of a circle obtained by a projecting method.

The average particle sizes of these powders are the arithmetic mean of the particle sizes and are obtainable by measuring 500 primary particles. Primary particles are independent particles not agglomerated.

When the shapes of particles are specific, e.g., the case (1) in the above definition of particle sizes, an average particle size is called an average long axis length, and the arithmetic mean of the value of (long axis length/short axis length) is called an average acicular ratio. Further, a short axis length is the maximum of the axes orthogonal to long axes. In the case (2) of the above definition, an average particle size is called an average tabular size, and the arithmetic mean of the value of (tabular size/tabular thickness) is called an average tabular ratio. Here, a tabular thickness is a thickness or a height. In the case of (3) in the definition, an average particle size is called an average particle size.

Figure 2:
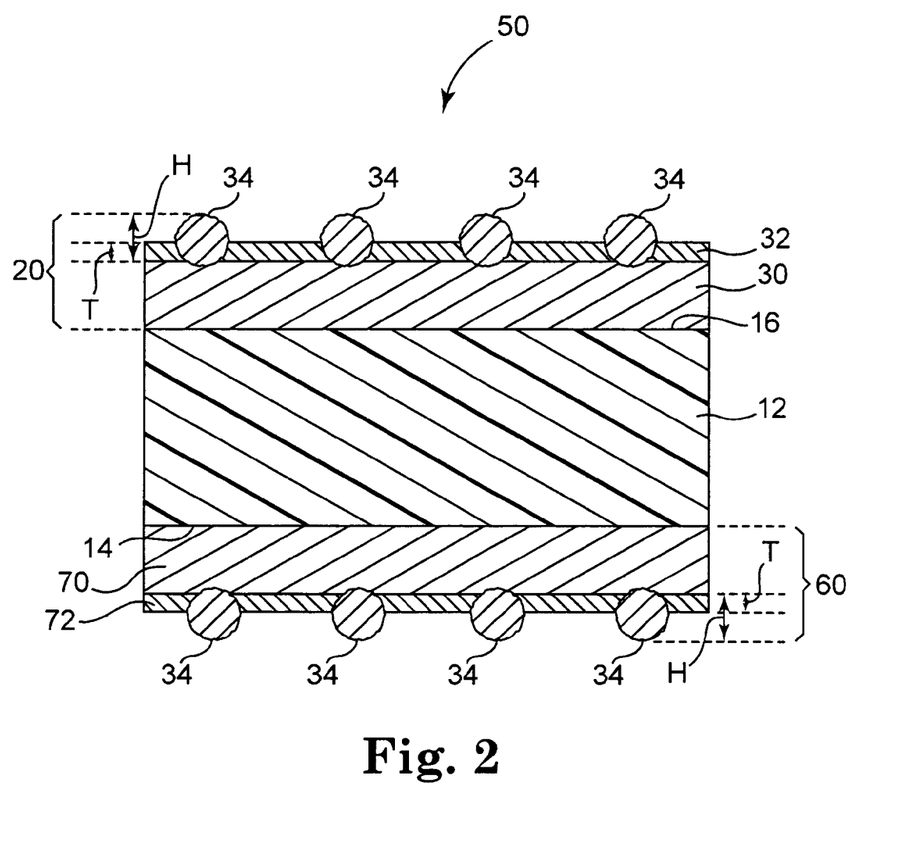
FIG. 2 is a schematic cross-sectional view of a magnetic recording tape according to another embodiment.

FIG. 2 is a schematic cross-sectional view of a magnetic recording tape 50 according to another embodiment in which the tape 10 describe above is modified to include a second magnetic film 60 or a second magnetic side 60. Magnetic recording tape 50, except for those differences specifically enumerated herein, is substantially similar to the magnetic recording tape 10. The second magnetic film 60 is similar to the first magnetic film 20 and includes a support layer 70, a magnetic recording layer 72, and particles 34 as described above distributed or disposed in the magnetic recording layer 72.

The second support layer 70, which is similar to the support layer 30, is coated over the first surface 14 of the substrate 12. The second magnetic recording layer 72 is similar to the first magnetic recording layer 32 described above and extends over the second support layer 70 opposite the first magnetic recording layer 32. As such, the second magnetic recording layer 72 defines a second exposed magnetic recording surface opposite the first exposed magnetic recording surface 32. The second magnetic recording layer 72 has a thickness T and the particles 34 have a dimension H that is a factor of between about 2-5 greater than the thickness T of the second magnetic recording layer 72. Although the remainder of this description refers to magnetic recording tape 10 with a single magnetic side 20, it should be understood that the description also translates to use with the dual magnetic side recording tape 50. In particular, the second magnetic side 60 is configured to provide a logarithmic bit error rate of less than −6 for recording densities of between 180-210 kfci, and the particles 34 configure the second magnetic side 60 to have an 5-pass static friction of less than about 80 grams force as described below.

One Suitable Manufacturing Process

The components of the support layer 30, the magnetic side 20, and the backside 18 are combined in a suitable manner and coated in the orientation described above to form the magnetic recording tape 10.

In one embodiment, the manufacture of the magnetic recording tape 10 includes an in-line portion and one or more off-line portions. The in-line portion includes unwinding the substrate 12 from a spool or supply reel. The first surface 14 of substrate 12 is coated with the backside 18 material and dried, typically using conventional ovens. The magnetic side 20 is applied to the substrate 12. In one embodiment, the support layer 30, the magnetic layer 32, and the backside 18 are applied to substrate 12 employing wet-on-wet, dual-slot, sequential die, or other suitable coating processes. In embodiments employing a single layer magnetic side construction, the magnetic recording layer 32 is applied directly to the substrate 12.

The coated substrate is magnetically orientated, dried, and then calendered. For example, the magnetic media is advanced through one or more magnetic fields to generally align the magnetic orientation of the metal particles of the magnetic recording layer 32. In one example, the magnetic field is formed by electric coils and/or permanent magnets.

Calendering includes in-line calendering with one or both of a compliant-on-steel (COS) or steel-on-steel (SOS) station. COS in-line calendering employs one or more nip stations having a steel or other generally non-compliant roller that contacts the magnetic side 20 and a rubberized or other generally compliant roll that contacts the backside 18. The SOS in-line calendering employs one or more nip stations each having generally non-compliant (e.g., steel) rolls. The generally non-compliant roll is configured to provide a desired degree of smoothness to the magnetic side 20. In one embodiment, calendering further includes heating the rollers contacting the magnetic side 20.

After in-line calendering, the magnetic recording tape 10 is wound on a spool. In some embodiments, the magnetic recording tape 10 is transported to an off-line station or a dedicated stand-alone machine and calendered again and then re-wound a second time.

In one embodiment, the manufacture of the magnetic recording tape 10 includes a heat soak process. The heat soak process generally places a completed, wound roll of the magnetic tape 10 in an environment of 50° F. for 48 hours to advance the cure of the magnetic recording media and to cause relaxation of residual stresses within the magnetic recording tape 10. The wound and processed roll of magnetic recording tape 10 is then split, burnished, and tested according to methods employed in the industry.

EXAMPLES

TABLE 1

| Sample | Description | Density | BB SNR | SKIRT SNR | Large Defect Rate | Small Defect Rate | Defect BER |
|---|---|---|---|---|---|---|---|
| PT7233E20104 | Control | 6730 | 1.88 | 0.33 | 3.31 | 5.35 | 6.42E−07 |
| PT7233E20106 | Control | 6730 | 2.24 | 0.22 | 3.44 | 5.23 | 6.44E−07 |
| PT7233E10201 | 0.3 wt % 300 nm Silica | 6730 | 1.33 | 0.07 | 3.04 | 5.57 | 6.39E−07 |
| PT7233E10202 | 0.3 wt % 300 nm Silica | 6730 | 1.87 | −0.41 | 2.69 | 5.29 | 5.92E−07 |
| PT7233E10203 | 0.3 wt % 300 nm Silica | 6730 | 1.73 | −0.09 | 2.59 | 5.27 | 5.84E−07 |
| PT7233E10205 | 0.3 wt % 300 nm Silica | 6730 | 1.74 | −0.05 | 2.71 | 4.46 | 5.33E−07 |
| PT7233E10207 | 0.3 wt % 300 nm Silica | 6730 | 1.71 | −0.07 | 3.05 | 5.08 | 6.03E−07 |
| PT7233E10304 | 0.6 wt % 300 nm Silica | 6730 | 1.61 | 0.09 | 2.60 | 6.90 | 7.05E−07 |
| PT7233E10305 | 0.6 wt % 300 nm Silica | 6730 | 1.48 | 0.32 | 2.90 | 7.64 | 7.83E−07 |
| PT7233E10306 | 0.6 wt % 300 nm Silica | 6730 | 1.74 | 0.01 | 2.49 | 6.28 | 6.51E−07 |
| PT7233E10308 | 0.6 wt % 300 nm Silica | 6730 | 1.47 | −0.74 | 3.05 | 8.28 | 8.41E−07 |
| PT7233E10309 | 0.6 wt % 300 nm Silica | 6730 | 0.96 | −0.20 | 3.38 | 12.32 | 1.16E−06 |
| PT7233E10401 | 1.0 wt % 300 nm Silica | 6730 | 0.50 | −1.26 | 3.47 | 19.43 | 1.70E−06 |
| PT7233E10403 | 1.0 wt % 300 nm Silica | 6730 | 1.08 | 0.29 | 2.51 | 9.26 | 8.74E−07 |
| PT7233E10406 | 1.0 wt % 300 nm Silica | 6730 | 1.03 | −0.37 | 2.33 | 12.47 | 1.09E−06 |
| PT7233E10407 | 1.0 wt % 300 nm Silica | 6730 | 0.79 | 0.17 | 2.26 | 11.60 | 1.02E−06 |
| PT7233E10408 | 1.0 wt % 300 nm Silica | 6730 | 1.08 | −2.14 | 2.38 | 11.57 | 1.03E−06 |

Table 1 presents data for various magnetic recording tapes identified as the 7233 series of magnetic recording tapes, including a control example and examples of magnetic recording tapes 10 according to embodiments described above.

The 7233E20106 magnetic recording tape, hereinafter identified as "Control," does not include particles 34 that protrude from the magnetic recording layer and has a broadband signal-to-noise ratio (BBSNR) of 2.24 dB relative to a standard, a skirt signal-to-noise ratio (skirt SNR) of 0.22 dB relative to a standard, and a bit error rate (BER) of $6.44577 \times 10^{-7}$.

Example 1 is represented by 7233E10207 and includes 300 nm silica particles 34 as described above provided to the magnetic side at 0.3 weight %.

Example 2 is represented by 7233E10306 and includes 300 nm silica particles 34 as described above provided to the magnetic side at 0.6 weight %.

Example 3 is represented by 7233E10407 and includes 300 nm silica particles 34 as described above provided to the magnetic side at 1.0 weight %.

BBSNR is the ratio of average signal power to the average integrated broadband noise power of a magnetic recording tape clearly written at the test recording density. The noise power is integrated from about 1 MHz to 20 MHz. One example method of measuring BBSNR is described in ECMA International Standard 319. In one embodiment, the BBSNR of the magnetic recording tape 10 is substantially equal to a standard LTO4 magnetic recording tape.

Skirt SNR is a measure of the modulation noise-for-noise sources that frequencies close to the fundamental write frequency of the magnetic recording tape. Skirt SNR is typically measured by comparing the peak signal power and the integrated noise power within one megahertz of the fundamental write frequency of the magnetic recording tape. One example method of measuring skirt SNR is described in ECMA International Standard 319. In one embodiment, the Skirt SNR of the magnetic recording tape 10 is substantially equal to the standard LTO4 magnetic recording tape.

Table 1 indicates that there is only a marginal and slight increase in the BBSNR and skirt SNR as additional weight percents of 300 nm silica is added to the magnetic layer dispersion. Large defects are substantially constant across the weight percent range of the silica. The small defects only increase by a factor around 2 even with the addition of 1.0 weight % 300 nm silica.

Examples 1, 2, and 3 having particles 34 protruding from their respective magnetic recording layers exhibit surprisingly low measurable defects and low bit error rates when measured in a generation 4 LTO drive at increased linear densities.

Test Results: Bit Error Rate (BER)

Figure 3:
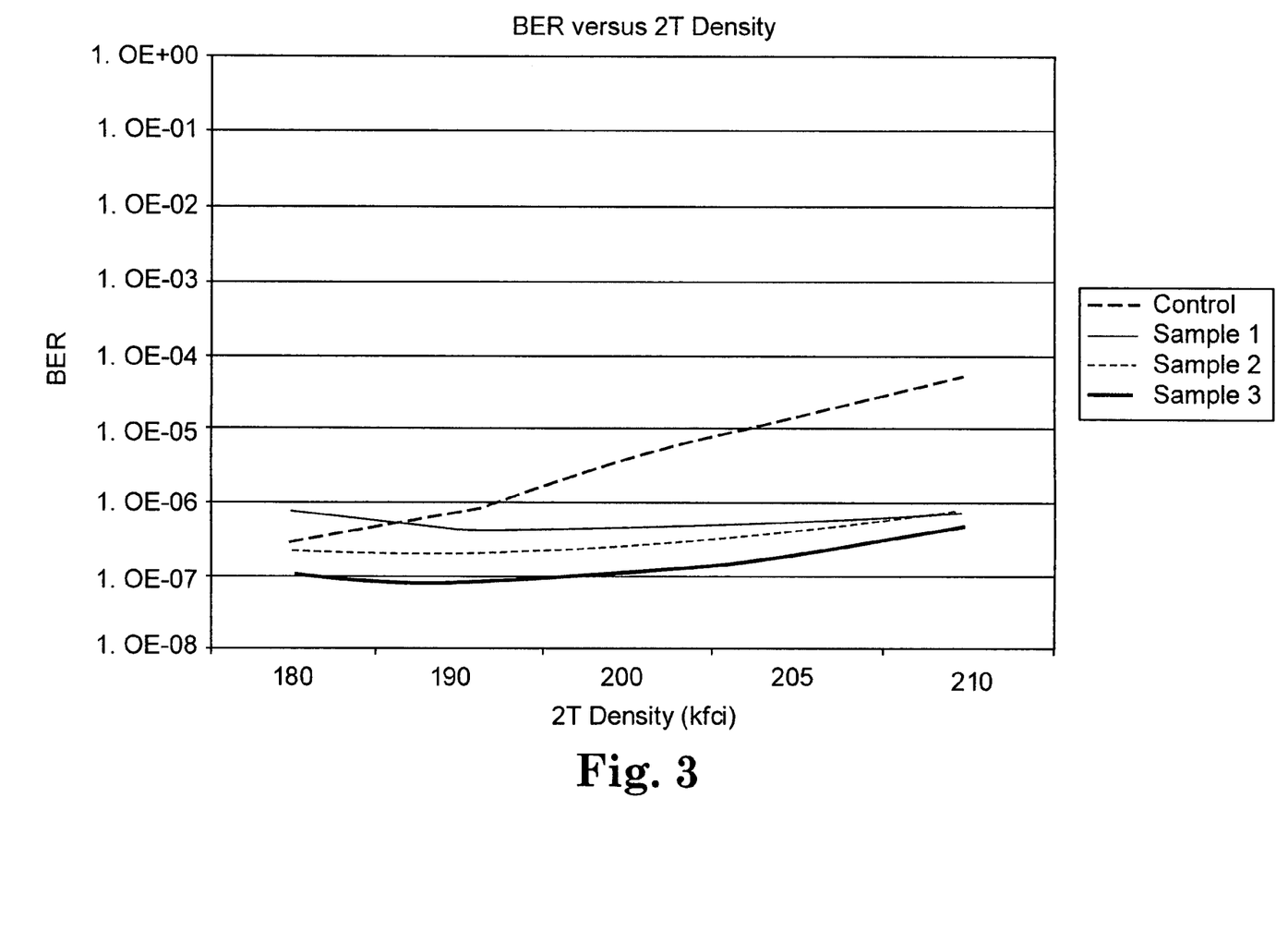
FIG. 3 is a graph of bit error rate for the magnetic recording tape of FIG. 1 employed in a drive configured to write a high density signal to the tape.

FIG. 3 is a graph of bit error rate for the magnetic recording tape 10 of Examples 1, 2, and 3 compared to the Control tape as employed in a drive that is configured to write a high density signal to the tapes.

In one embodiment, the tape drive is specified to have a linear density ranging from 180 kfci up to about 210 kfci. State of the art magnetic recording tapes are operated in tape drives having a specified linear density of about 170 kfci. With this in mind, FIG. 3 represents a challenge conducted in a very high linear density regime.

FIG. 3 represents comparative bit error rate signals that are read when the tape drive writes a signal in the range between 180-210 kfci. The bit error rate is plotted as a log plot ranging from $10^{-3}$ down to $10^{-7.5}$. The Control tape is a state of the art tape that does not include particles 34 and has a bit error rate ranging from $10^{-6.5}$ at 180 kfci up to a relatively large error rate of $10^{4.5}$. The Control tape exhibits error rates that are so large that the tape drive is essentially unable to write a signal for linear densities of over 200 kfci. In other words, the tape drive is encountering nothing but errors for the Control tape at linear recording densities of above 200 kfci.

In contrast, the magnetic recording tapes 10 of Examples 1, 2, and 3 exhibit bit error rates of less than $10^{-6}$ for tape drive signals having linear densities of between 180 and 210 kfci. Surprisingly, even though the magnetic recording tapes 10 include particles 34 that are 2-5 times the thickness T of the magnetic recording layer 32, added to the magnetic recording layer at between 0.3 to 1.0 weight %, the bit error rates are surprisingly low (less than $10^{-6}$) for high linear recording densities of between 180-210 kfci.

Generation 4 LTO tape drives have a drive head with a magneto-resistive element that is about 5.1 micro meters wide for reading. The particles 34 that are added to the magnetic tape 10 are about one-half the size of the reader head. Considering this, it has been surprisingly discovered that these relatively large particles 34 (large as compared to the size of the tape drive head and as compared to the Thickness T of the recording layer 32) provide a bit error rate of less than $1 \times 10^{-6}$ for high linear recording densities of between about 180-210 kfci.

Test Results: Friction

Friction results are represented by a friction force, or alternatively, a coefficient of friction. In this regard, friction testing was conducted under the methods specified by the Ultrium consortium by employing an Ultrium vertical friction tester having a transducer and systems load cell Model FT500AG (or its equivalent). Ultrium refers to the linear tape open (LTO) consortium including drive manufacturers HP, IBM, and Quantum who have developed the Ultrium LTO format in response to mid-range and enterprise storage demands of data storage users.

Friction testing is done with a vertical friction tester or its equivalent. The static coefficient of friction and the friction force is determined by cutting a magnetic tape sample in 24 inch lengths. The samples are conditioned at 64+−4 degrees F and 45+−5% relative humidity. The vertical friction tester or its equivalent includes a test $Al_2O_3$/TiC mandrel onto which the lengths of the magnetic tape samples are attached. One end of the magnetic tape sample hangs over the mandrel and has a 65 gram test weight attached to the sample end. In this manner, the magnetic tape is wrapped 180 degrees around the test mandrel. A load cell of the vertical friction tester is set to zero and a motorized drive is started.

The tape is wound around the mandrel such that the magnetic side of the magnetic recording tape contacts the $Al_2O_3$/TiC mandrel. The friction test is operated in a "stutter-start" manner where the drive is started for five seconds, then stopped. The operator waits five seconds, then starts the drive again, at which point friction testing begins. The sample portion of the magnetic recording tape is pulled along the $Al_2O_3$/TiC mandrel such that the magnetic side contacts the mandrel. The magnetic side of the magnetic recording tape is drawn over the $Al_2O_3$/TiC cylinder eight separate times in succession. The resulting friction force in grams-force is measured for each of the eight passes. The 5-pass static friction force is defined to be the average static friction force of the last 5 pulls out of 8 sequential pulls on a magnetic tape sample. The 5-pass dynamic friction force is defined to be the average dynamic friction force of the last 5 pulls out of 8 sequential pulls on a magnetic tape sample.

Figure 4:
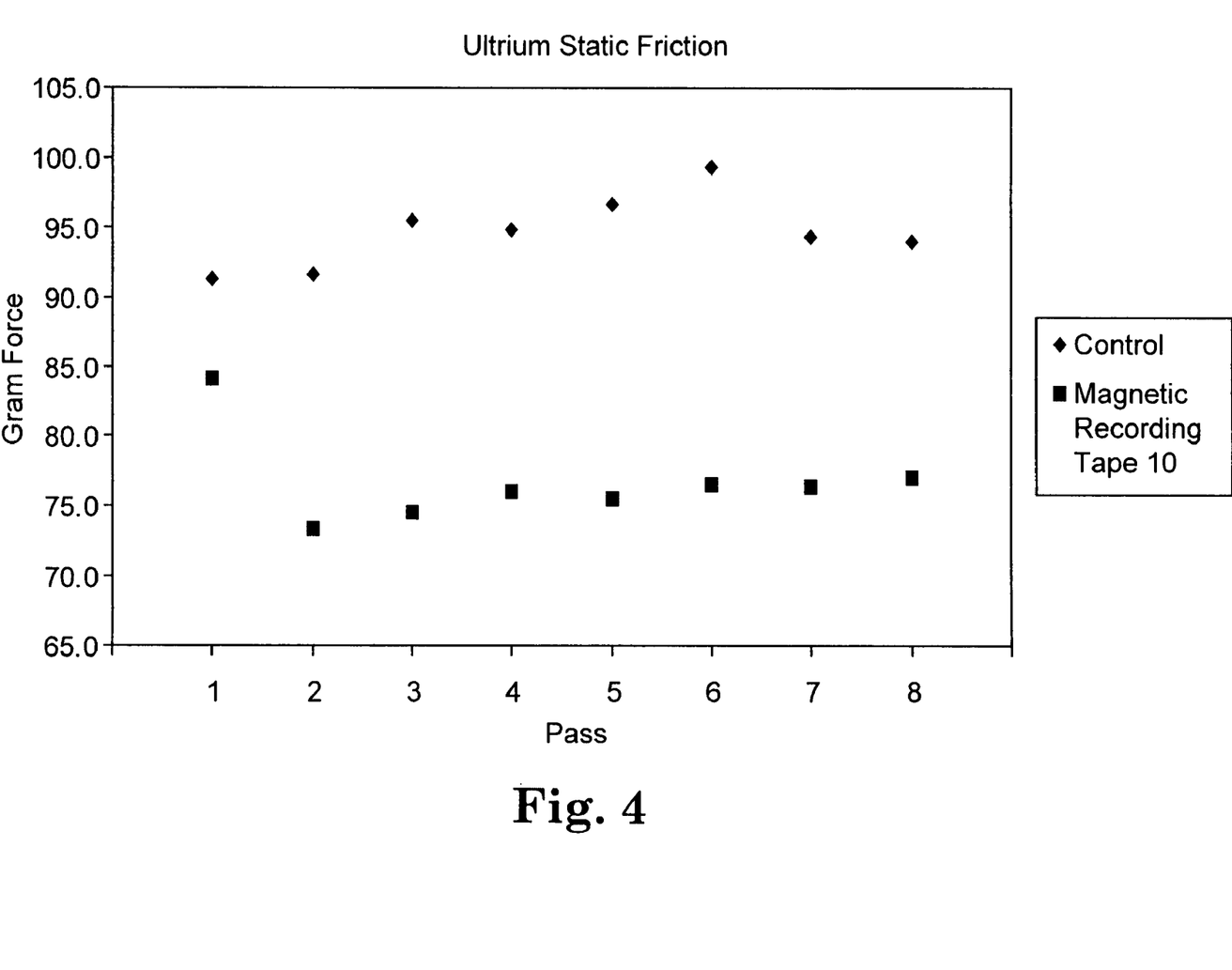
FIG. 4 is a graph of static friction for the magnetic recording layer of FIG. 1.

FIG. 4 is a comparative graph of static friction for the magnetic recording tape 10 compared to a Control sample without particles 34. The magnetic recording tape 10 includes 300 nm Seahostar silica particles distributed in the magnetic recording layer 32 that provide the magnetic recording tape 10 with a substantial drop in static (and dynamic) friction.

While not bound to this theory, it is believed that the reduced friction results from the particles 34 projecting from the magnetic layer 32 to define a reduced contact surface area. The reduced surface area available for contact results in lower friction between the magnetic recording tape 10 and the drive head. The magnetic recording tape 10 has low friction and is configured to function in tape drives without sticking. In particular, the particles 34 configured the magnetic recording layer 32 to have an 5-pass static friction of less than about 80 grams force.

Although specific embodiments have been described herein, it will be appreciated by those of ordinary skill in the art that a wide variety of alternate and/or equivalent implementations calculated to achieve the same purposes may be substituted for the specific embodiments described without departing from the scope of the invention. This application is intended to cover any adaptations or variations of magnetic recording tape backsides having both low friction and low surface roughness as discussed herein. Therefore, it is manifestly intended that this invention be limited only by the claims and their equivalents.

What is claimed is:

1. A magnetic recording tape comprising:
   an elongated substrate; and
   a magnetic film coated over the elongated substrate, the magnetic film including a first magnetic recording layer;
   wherein the first magnetic recording layer comprises particles having a diameter that is between a factor from greater than 3 to about 5 greater than a thickness of the first magnetic recording layer, and
   wherein the first magnetic recording layer defines a broadband signal-to-noise ratio greater than approximately 1.

2. The magnetic recording tape of claim 1, wherein the magnetic film comprises a support layer deposited on the elongated substrate between the elongated substrate and the first magnetic recording layer.

3. The magnetic recording tape of claim 2, wherein the first magnetic recording layer comprises a thickness of less than about 150 nm.

4. The magnetic recording tape of claim 2, wherein the particles contact the support layer and protrude out of the first magnetic recording layer.

5. The magnetic recording tape of claim 4, wherein the particles configure the first magnetic recording layer to have a 5-pass static friction of less than about 80 grams force.

6. The magnetic recording tape of claim 1, wherein the particles have a surface including a silane surface modification.

7. The magnetic recording tape of claim 6, wherein the silane surface modification comprises a silane coupling agent in combination with titanium trisisostearyl isopropoxide.

8. The magnetic recording tape of claim 1, wherein the first magnetic recording layer comprises a bit error rate of less than $1 \times 10^{-6}$ for recording densities of between 180-210 kfci.

9. The magnetic recording tape of claim 1, wherein the particles are selected from the group consisting of silica particles, titanium dioxide particles, antimony pentoxide particles, silicon carbide particles, and alumina particles.

10. The magnetic recording tape of claim 1, further comprising:
    a second magnetic film coated over the elongated substrate opposite the first magnetic recording layer;
    wherein the second magnetic film comprises a second magnetic recording layer comprising particles having a diameter that is between a factor from about 3 to 5 greater than a thickness of the second magnetic recording layer.

* * * * *

UNITED STATES PATENT AND TRADEMARK OFFICE
CERTIFICATE OF CORRECTION

| | | |
|---|---|---|
| PATENT NO. | : 7,816,023 B2 | Page 1 of 1 |
| APPLICATION NO. | : 12/004644 | |
| DATED | : October 19, 2010 | |
| INVENTOR(S) | : Jensen et al. | |

It is certified that error appears in the above-identified patent and that said Letters Patent is hereby corrected as shown below:

Column 13, line 17 (Claim 1), "greater than approximately 1." should read -- greater than approximately 1 decibel (dB). --

Signed and Sealed this
Thirteenth Day of March, 2012

David J. Kappos
*Director of the United States Patent and Trademark Office*